United States Patent
Kurusu et al.

(10) Patent No.: US 7,142,755 B2
(45) Date of Patent: Nov. 28, 2006

(54) OPTICAL FIBER AND EVALUATION METHOD THEREOF

(75) Inventors: Kazuhiko Kurusu, Chiyoda-ku (JP); Hideya Moridaira, Chiyoda-ku (JP); Masahide Kuwabara, Chiyoda-ku (JP); Yoshinori Ishida, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/132,277

(22) Filed: May 19, 2005

(65) Prior Publication Data

US 2005/0220430 A1    Oct. 6, 2005

Related U.S. Application Data

(62) Division of application No. 10/411,378, filed on Apr. 11, 2003, now Pat. No. 6,944,381.

(30) Foreign Application Priority Data

Aug. 28, 2002  (JP) .............................. 2002-249274
Dec. 26, 2002  (JP) .............................. 2002-378500

(51) Int. Cl.
  *G02B 6/02*  (2006.01)
  *C03B 37/07*  (2006.01)
  *G01N 21/00*  (2006.01)

(52) U.S. Cl. ..................... 385/123; 385/147; 65/29.12; 65/377; 356/73.1

(58) Field of Classification Search ..................... None
See application file for complete search history.

(56) References Cited

U.S. PATENT DOCUMENTS 5,320,658 A       6/1994   Ohga et al.
2003/0086670 A1   5/2003   Moridaira et al.
2006/0013546 A1*  1/2006   Kurusu et al. .............. 385/123

* cited by examiner

*Primary Examiner*—Michelle Connelly-Cushwa
(74) *Attorney, Agent, or Firm*—Eric J. Robinson; Robinson Intellectual Property Law Office, P.C.

(57) ABSTRACT

An optical fiber characterized by a cutoff wavelength of 1310 nm or less, a transmission loss of 0.40 dB/km or less at the wavelength of 1385 nm before hydrogen ageing, a transmission loss of 0.40 dB/km or less in the wavelength range of 1310 nm to 1625 nm after hydrogen ageing, and an electron spin density of the Non-Bridging Oxygen Hole Center of $1 \times 10^{13}$ spins/g or less measured by the electron spin resonance method after the diameter of the optical fiber is made to be about 50 μm by etching in diluted hydrofluoric acid, that having high reliability of hydrogen-proof characteristic suitable for WDM transmission in 1310 nm to 1625 nm and the method of evaluating the optical fiber are offered.

3 Claims, 5 Drawing Sheets

OPTICAL FIBER AND EVALUATION METHOD THEREOF

FIELD OF THE INVENTION

This invention concerns an optical fiber, which has high reliability of the hydrogen-proof characteristic and is suitable for WDM transmission in 1310 nm to 1625 nm and also the method of evaluating the optical fiber.

BACKGROUND OF THE INVENTION

In recent years, research on the Wavelength Division Multiplexing (WDM) transmission is very active and a lot of investigations are also performed to obtain an optical fiber suitable for this WDM transmission. The optical fiber used for the WDM transmission is required to have a low loss in the whole wavelength range to be used.

Though, up to now, the WDM transmission has been examined around 1.55 μm band, wherein the transmission loss of the silica glass optical fiber is the lowest, the further expansion of the transmission capacity is demanded. Therefore, attempts are made to expand the used wavelength range to 1310 nm–1625 nm.

On the other hand, the OH group, which causes the absorption peak around 1385 nm, was often included in a conventional optical fiber as impurities. The optical fiber including these impurities shows a large transmission loss around 1385 nm.

In addition, when hydrogen diffuses in the optical fiber, it is known that the transmission loss around the wavelengths of 1240 nm, 1385 nm, 1530 nm or the wavelength range longer than 1530 nm etc. are increasing. These increases of the transmission loss are based on an increase of the absorption peak owing to the OH group.

It is necessary to reduce these absorption peaks as much as possible in order to expand the wavelength range of the WDM transmission to 1310 nm–1625 nm.

The phenomenon of the increase of transmission loss by the hydrogen diffusion to the optical fiber is generated by the following mechanism.

In general, the structural defect, which is called an oxygen-excessive or oxygen-deficient paramagnetic defect, exists in the optical fiber. It is known that, among the paramagnetic defects, the Non-Bridging Oxygen Hole Center (NBOHC) has an especially big influence on the increase of the transmission loss of the optical fiber.

When hydrogen diffuses in the optical fiber, a diffused hydrogen molecule reacts with a paramagnetic defect and creates an atomic bond having absorption in the transmission range of the optical fiber, and an increase of the transmission loss occurs.

Concretely, when a paramagnetic defect is the NBOHC, the OH group is generated by the reaction shown by the following expression, and the OH absorption loss is increased.

(1)

Here, Si—O is the NBOHC. Moreover "." shows unpaired electron and "≡" shows the covalent bond with three oxygen atoms.

Especially, when many NBOHCs exist in a Mode Field Diameter (MFD) of the optical fiber, an increase of the OH absorption loss is remarkable, and it increases with time as hydrogen diffuses.

Therefore, it is necessary to decrease the NBOHC, especially the NBOHC in the MFD, to improve the hydrogen-proof characteristic of the optical fiber.

The optical fiber, in which the OH absorption loss is controlled and which has a refractive index profile similar to the Single Mode Fiber (SMF), is proposed in the U.S. Pat. No. 6,131,415.

In the optical fiber proposed in this patent, it is supposed that optical transmission throughout the wavelength range of 1200–1600 nm becomes possible.

Moreover, it is shown that the NBOHC causes absorption around the wavelength of 630 nm in (Y. Hibino and H. Honafusa, J. Appl. Phys.,60,1797.(1986), etc).

On the other hand, the method of exposing the optical fiber to hydrogen or deuterium during the drawing process or after the drawing is proposed as the method to decrease the NBOHC density in the optical fiber (Refer to Japanese Laid-Open Patent Application (JP-A;KOKAI) No.Hei7-277770).

However, when the hydrogen ageing is carried out, abovementioned reaction of the expression (1) occurs. And, though the NBOHC disappears, on the other hand, there is a problem that the OH absorption loss increases.

Therefore, in order to decrease the NBOHC density, the deuterium ageing is suitable because an increase of the OH absorption loss doesn't occur accompanying to the disappearance of the NBOHC.

The reaction shown by the following expression takes place in the optical fiber when the deuterium ageing is carried out.

(2)

That is, the OD group is generated, and the OH absorption doesn't occur. Since the OD group doesn't have any large absorption peak in 1310 nm–1625 nm, there is little influence on the transmission loss in this wavelength range.

Moreover, so far it was the only method of evaluating the degree of a loss increase when the optical fiber was exposed to hydrogen (hereafter it is called the hydrogen-proof characteristic) wherein a part of the product was extracted as a sample to which the hydrogen ageing was carried out to confirm the presence of the problem.

Especially, the hydrogen ageing condition as shown below is provided, for instance, by IEC60793-2 Amendment 1,2001-8 Annex C recently.

The optical fiber is exposed to the atmosphere containing hydrogen of 1 volume %, i.e., 0.01 atmospheres at room temperature until the transmission loss increases 0.03 dB/km or more at 1240 nm compared with the loss of exposing before (the initial loss), and the transmission loss is measured after leaving it in open atmosphere for more than 14 days.

SUMMARY OF THE INVENTION

Up to now, various optical fibers are proposed as optical fibers suitable for WDM transmission in 1310 nm–1625 nm, wherein the transmission loss at 1385 nm mainly due to OH absorption is suppressed and they have excellent hydrogen-proof characteristic. Moreover, the technology of deuterium ageing of the optical fibers is indicated as a method of decreasing the NBOHC density in the optical fiber.

However, there is no report to clearly show the relation between the amount of an increase of the transmission loss at the wavelength of 1385 nm after hydrogen ageing and the NBOHC density in the optical fiber.

Moreover, the method of performing hydrogen ageing to the optical fiber after the deuterium ageing and measuring the amount of an increase of the transmission loss was the only method of evaluating whether sufficient deuterium ageing was carried out.

The inventors of the present invention clarify the relation between the NBOHC density in the optical fiber and the amount of an increase of the transmission loss at the wavelength of 1385 nm, and find that the signal concerning the structural defect of Si(D)-E' and/or Ge(D)-E' is detected by the Electron-Spin Resonance method (ESR) from the optical fiber to which the deuterium ageing was carried out.

The purpose of the present invention is to offer an optical fiber which has high reliability of the hydrogen-proof characteristic suitable for the WDM transmission in 1310 nm–1625 nm by clarifying the relation between the NBOHC density in the optical fiber and the amount of an increase of the transmission loss at the wavelength of 1385 nm and finding that the signal of Si(D)-E' and/or Ge(D)-E' is detected from the optical fiber to which the deuterium ageing was carried out. In addition, the purpose of the present invention is to offer a method of evaluating the hydrogen characteristic of the optical fiber and whether sufficient deuterium ageing was carried out.

That is, the optical fiber of the present invention is characterized by a cutoff wavelength of 1310 nm or less and a transmission loss of 0.40 dB/km or less at the wavelength of 1385 nm before hydrogen ageing, which is further characterized by a transmission loss of 0.40 dB/km or less in a wavelength range of 1310 nm to 1625 nm after hydrogen ageing, wherein the transmission loss after hydrogen ageing is measured after exposing the optical fiber to an atmosphere containing hydrogen of about 0.01 atmospheres at room temperature until an increase of a transmission loss of 0.03 dB/km or more at a wavelength of 1240 nm compared with said transmission loss before hydrogen ageing, and in open atmosphere for more than 14 days, and the electron spin density of the NBOHC is $1 \times 10^{13}$ spins/g or less, wherein the electron spin density is measured by the ESR method after the diameter of the optical fiber is made to be about 50 μm by etching with diluted hydrofluoric acid.

The optical fiber of the present invention includes deuterium, and when measuring it by the ESR method, the electronic spin density of Si(D)-E' is detected. And when measuring it by the ESR method after the diameter of the optical fiber is made to be about 50 μm by etching with diluted hydrofluoric acid, the electronic spin density of Ge(D)-E' is detected.

A method of evaluation of an optical fiber of the present invention comprises measuring an electron spin density of the NBOHC by the ESR method after the diameter of the optical fiber is made to be about 50 μm by etching with diluted hydrofluoric acid, and estimating an amount of loss increase of the optical fiber at a wavelength of 1385 nm after hydrogen ageing, based upon said electron spin density of the NBOHC, wherein the loss increase after hydrogen ageing is measured after exposing the optical fiber to an atmosphere containing hydrogen of about 0.01 atmospheres at room temperature until an increase of a transmission loss of 0.03 dB/km or more at a wavelength of 1240 nm compared with a transmission loss before hydrogen ageing, and in open atmosphere for more than 14 days.

A method of evaluation of an optical fiber of the present invention comprises measuring an electron spin density of a bare optical fiber by the ESR method, and evaluating whether a deuterium ageing is executed sufficiently on the optical fiber, based on a detection of a signal of Si(D)-E'.

A method of evaluation of an optical fiber of the present invention comprises making a diameter of the optical fiber to be about 50 μm by etching with diluted hydrofluoric acid, measuring an electron spin density of the optical fiber by the ESR method, and evaluating whether a deuterium ageing is executed sufficiently on the optical fiber, based on a detection of a signal of Ge(D)-E'.

DESCRIPTION OF THE PREFERRED EMBODIMENTS

For the WDM transmission in the entire range of 1310 nm to 1625 nm to 1625 nm, it is desirable that the transmission loss is 0.40 dB/km or less after hydrogen ageing in this wavelength range.

Up to now, a value of transmission loss of 0.40 dB/km has been generally applied for the optical transmission of 1.3 μm band. And by setting the transmission loss after hydrogen ageing to be less than this value in the range of 1310 nm to 1625 nm, optical transmission equivalent with conventional optical transmission of 1.3 μm band becomes possible in this entire wavelength range.

At the moment, the maximum value of the absorption loss of 0.40 dB/km or less after hydrogen ageing in a wavelength range of 1310 nm to 1625 nm is specified in the IEC standard.

Generally, when the OH absorption loss is large, the maximum value of the transmission loss in a wavelength range of 1310 nm to 1625 nm exists in the vicinity of the wavelength of 1385 nm for a conventional optical fiber, and when the OH absorption loss is small, the maximum value of the transmission loss usually exists at 1310 nm. Moreover, a loss increase at 1310 nm by the hydrogen ageing is very small compared with a loss increase at 1385 nm.

Therefore, when the transmission loss at 1310 nm before hydrogen ageing is very small, and an increase in the OH absorption loss after hydrogen ageing is not too large, the transmission loss of 1310 nm after hydrogen ageing doesn't exceed 0.40 dB/km. Therefore, it only has to manage the transmission loss at 1385 nm after hydrogen ageing to be 0.40 dB/km or less so that the maximum value of the transmission loss in the wavelength range of 1310 nm to 1625 nm after hydrogen ageing is 0.40 dB/km or less.

Moreover, there is not substantially any problem even if the value measured at a wavelength of 1385 nm is assumed to be the maximum value though this OH absorption loss has the maximum value in the vicinity of 1383 nm to 1385 nm.

In the present invention, the optical fiber, of which the transmission loss is 0.40 dB/km or less in the entire range of 1310 nm to 1625 nm after hydrogen ageing, was achieved by assuming the transmission loss to be 0.40 dB/km or less at the wavelength of 1385 nm after the hydrogen ageing.

EXAMPLE

The optical fiber of the present invention is explained in detail by using the embodiments as follows.

A. Manufacture of Optical Fibers

1. The Targeted Optical Fiber for Manufacture

The targeted optical fiber for manufacture is assumed to be single mode optical fiber (SMF), that has zero dispersion wavelength in the 1.31 μm band.

Figure 2:
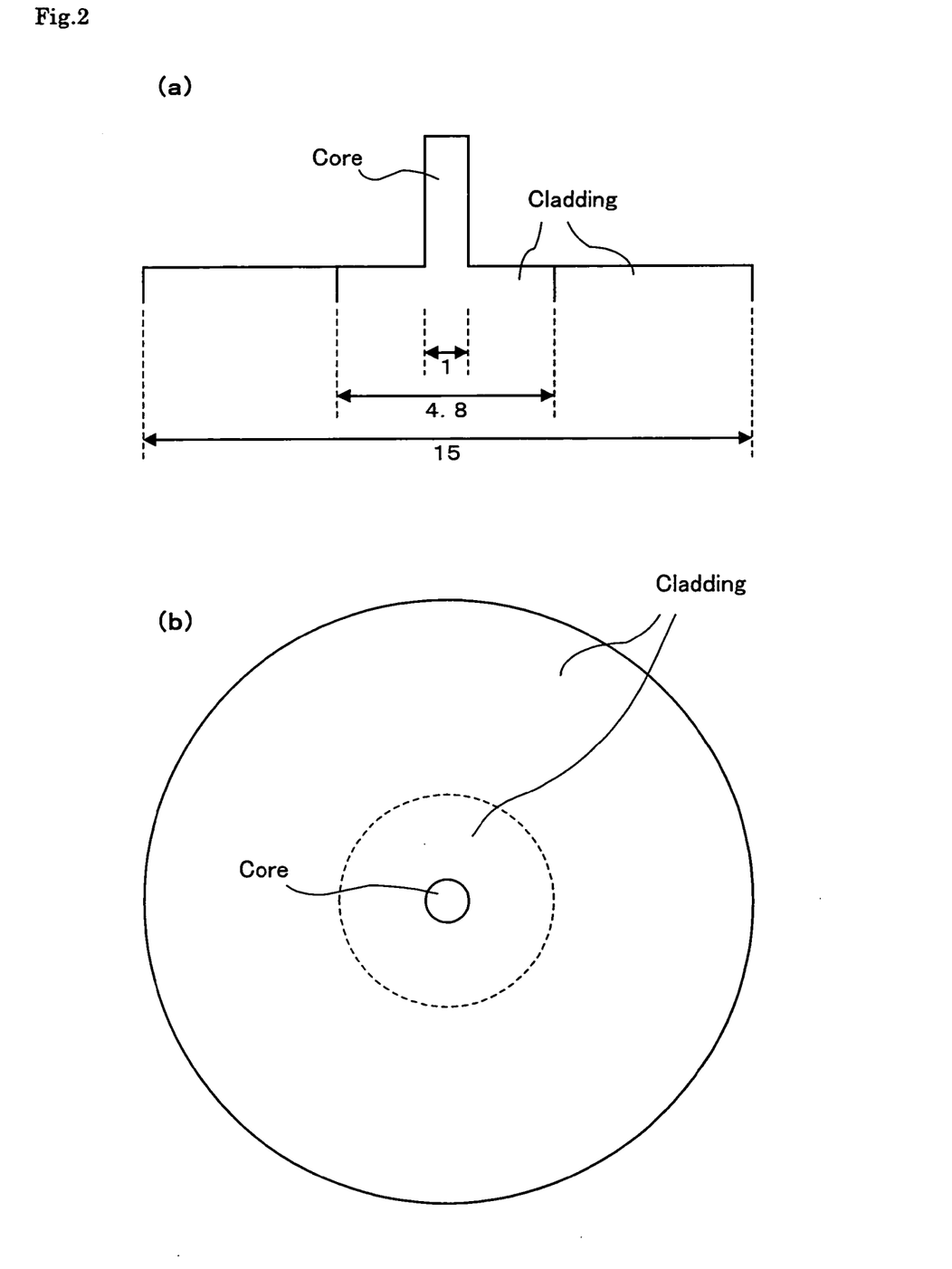
[FIG. 2]
(a) shows a refractive index profile and (b) shows a cross section of an optical fiber of an embodiment according to the present invention.

The general refractive index profile of the step index type core surrounded by the cladding as shown in FIG. 2(a), was adopted in the present embodiment, though the optical fiber of the present invention can be made with a variety of refractive index profiles.

2. Manufacture of Optical Fiber Preform

Figure 3:
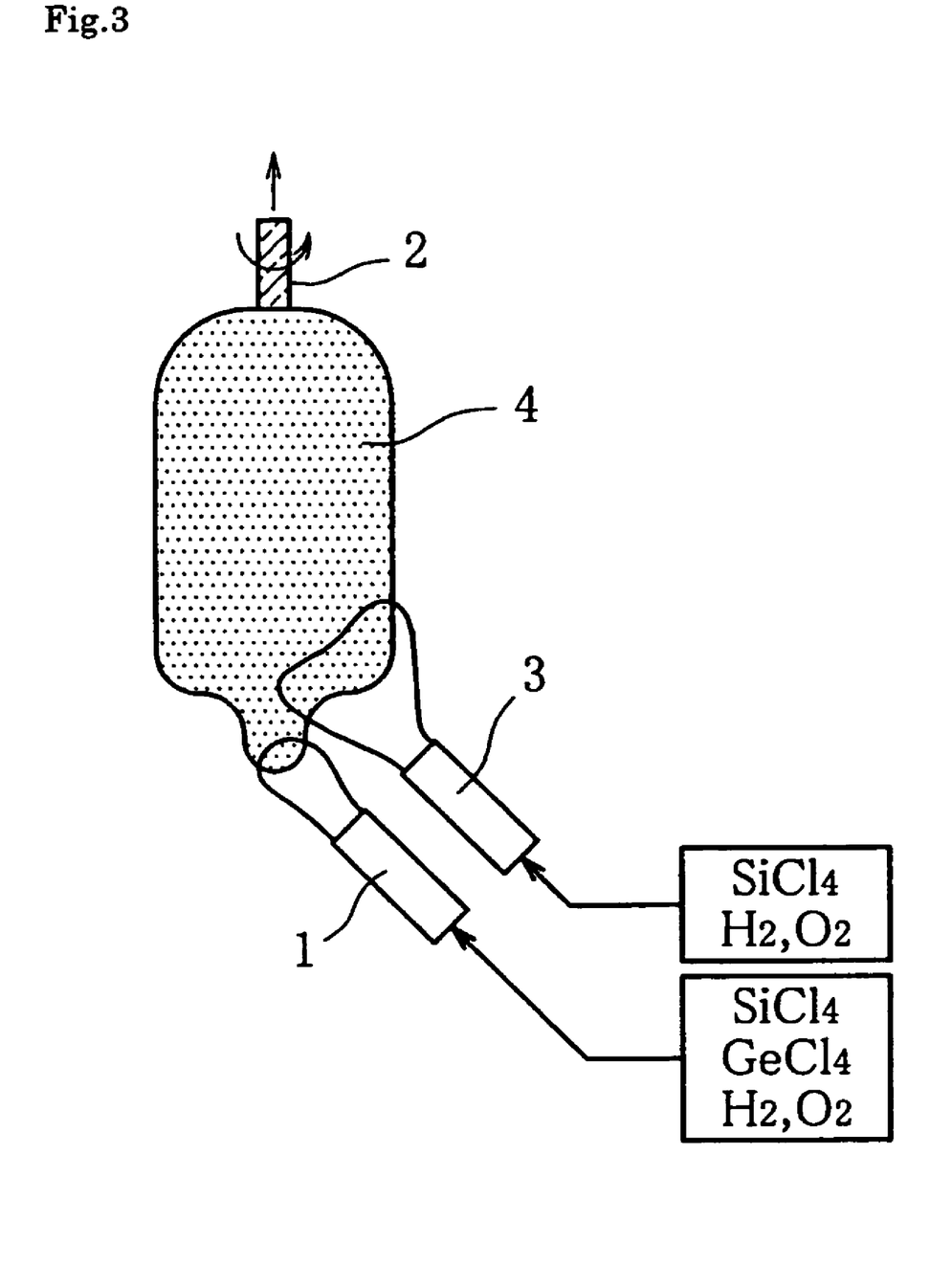
[FIG. 3]
It shows an outline chart of a method of manufacturing an optical fiber preform by the VAD method.

The optical fiber preform was manufactured by the VAD (Vapour-phase Axial Deposition) method as shown in FIG. 3, as follows.

$SiCl_4$ and $GeCl_4$, the raw material of the silica glass, were charged to the first burner 1 in the state of the vapor phase along with $H_2$ and $O_2$, and glass particles doped with Ge were generated by the flame hydrolysis reaction. Ge is a dopant to raise the refractive index. In the same way, $SiCl_4$ was charged to the second burner 3 along with $H_2$ and $O_2$, and glass particles were generated. These glass particles were deposited on the target rod 2, and porous soot preform 4 was formed.

The entire target rod 2 was pulled up while giving a constant rotation, and the bottom of the deposited surface of glass particles was controlled to a fixed position.

Next, this porous soot preform 4 was dehydrated and sintered under the conditions shown in the following table 1, then the porous soot preform was vitrified, and finally the transparent glass rod (hereafter, the core rod) was manufactured.

TABLE 1

|  | Dehydrating Step | sintering Step |
|---|---|---|
| Fireplace Temperature | 1200° C. | 1500° C. |
| He Gas | 10 l/min | 10 l/min |
| $O_2$ Gas | 1.0 l/min | — |
| Chlorine Gas | 0.1 l/min | 0.1 l/min |

This core rod contains the MFD part when made as an optical fiber, and the dehydrating and sintering conditions of this core rod have a big influence on the transmission loss. Especially, when the temperature is high in the dehydration process, and sintering advances under the oxygen atmosphere, it is known that a lot of oxygen-excessive defects (≡Si—O—O—Si≡) remain in the core rod.

The ratio of the outside diameter of the cladding to core of the obtained core rod (Hereafter, say the ratio of cladding/core) was 4.8/1.

In this specification, the diameter of the core is the value of the outer diameter of the core at the part of ½ of the maximum value of the relative refractive index difference of the core with the cladding.

From the viewpoint of manufacturing the optical fiber with few structural defects, the ratio of cladding/core should be large. When the optical fiber preform is manufactured, the glass layer that becomes a cladding is further formed surrounding the core rod and the manufacturing boundary is made between the core rod and this glass layer.

The OH group is formed easily on this manufacturing boundary, and also a structural defect is caused easily. Therefore, the optical fiber with few OH groups and the structural defect such as the NBOHC in the MFD can be manufactured by enlarging the ratio of cladding/core, and keeping the manufacturing boundary sufficiently away from the MFD.

Next, this core rod was heated and elongated to about 25 mm of outer diameter, and the silica glass particles of desired thickness are deposited outside of this core rod. In addition, it was sintered, the deposited layer was vitrified, and the optical fiber preform, that had the refractive index profile shown in FIG. 2(a), was manufactured. This optical fiber preform is a structure in which the core rod having the ratio of cladding/core of 4.8/1 was further surrounded by a cladding, and the ratio of outer diameters of the cladding to the core was about 15. At this time, the manufacturing boundary is a boundary of the core rod and the cladding surrounding the core rod, and it is shown in FIG. 2(b) in broken line.

3. Drawing of Optical Fiber Preform

Next, above-mentioned optical fiber preform was drawn and a target optical fiber was manufactured.

In this drawing process, since the optical fiber preform is heated to 2000° C. or more, melted and thinned to an outer diameter of about 125 μm and is cooled quickly at the cooling rate of 2000° C./sec or more while receiving big tension. Therefore, the optical fiber receives big stress at the drawing, and a structural defect such as the NBOHC is generated by this stress.

It is known that the NBOHC, remained after the drawing, greatly depends on the cooling rate.

For decreasing the remaining NBOHC, it is suitable to make the structure relaxation promoted by maintaining the optical fiber in a temperature range near the softening temperature as long as possible. This is substantially equivalent to drawing with the speed as slow as possible and temperature of the furnace as low as possible.

In consideration of this, it was drawn by using the following three conditions.

Condition 1: Temperature of drawing furnace of 1950° C. and drawing speed of 500 m/min.

Condition 2: Temperature of drawing furnace of 2000° C. and drawing speed of 1000 m/min.

Condition 3: Temperature of drawing furnace of 2050° C. and drawing speed of 1200 m/min.

B. Investigation of the Characteristics of the Optical Fiber

1. Measurement of the Transmission Characteristic

The cutoff wavelength and the transmission loss of each SMF manufactured under the drawing condition of the above-mentioned three levels were measured. Table 2 shows the measurement result. Here, SMF(1) shows the fiber drawn under the condition 1, SMF(2) shows the fiber drawn under the condition 2 and SMF(3) shows the fiber drawn under the condition 3.

The transmission loss is measured for the sample of 1000 m in the wavelength of 550 nm–1700 nm. The transmission loss at this time was assumed to be an initial value, and it was assumed as transmission loss (a).

Table 2 shows the transmission losses at 630 nm, 1310 nm, and 1385 nm.

The optical fiber is exposed to the atmosphere containing hydrogen of 0.01 atmospheres at room temperature until the transmission loss increases 0.03 dB/km or more at 1240 nm compared with the loss of exposing before (the initial loss), and the transmission loss is measured after leaving it in open atmosphere for more than 14 days. Moreover, the measurement wavelength was assumed to be 550 nm–1700 nm. The results are shown in FIG. 4 to FIG. 6.

Figure 4:
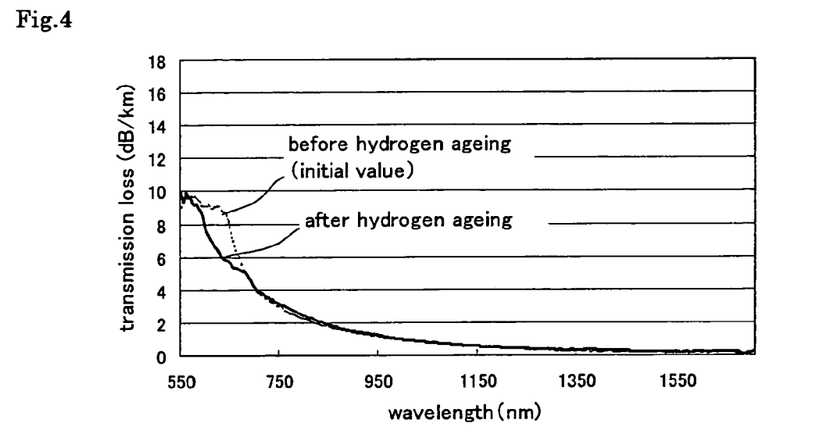
[FIG. 4]
It is a transmission loss spectrum before and after hydrogen ageing of the optical fiber SMF (1) of the embodiment according to the present invention.
Figure 5:
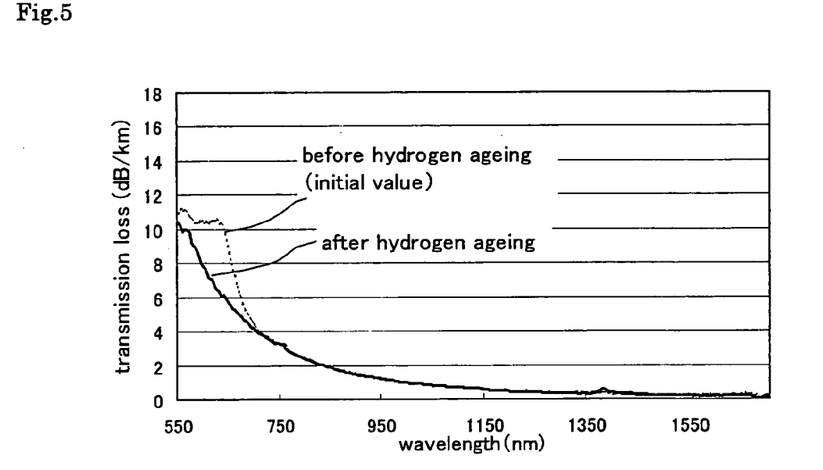
[FIG. 5]
It is a transmission loss spectrum before and after the hydrogen ageing of the optical fiber SMF (2) of the embodiment according to the present invention.
Figure 6:
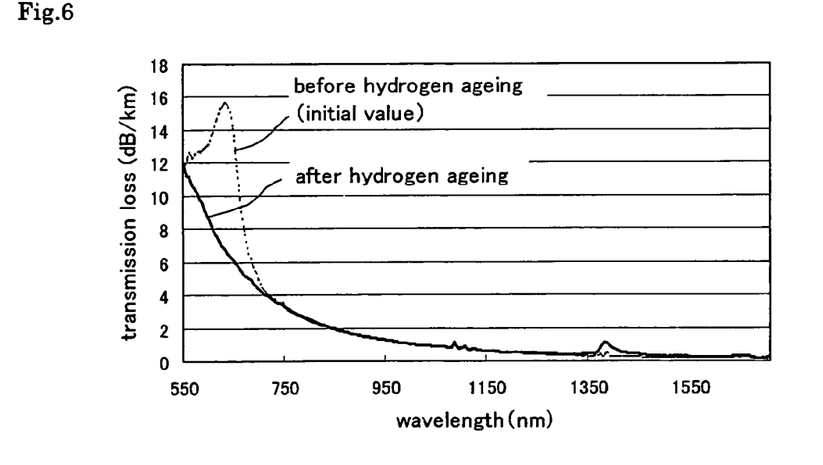
[FIG. 6]
It is a transmission loss spectrum before and after the hydrogen ageing of optical fiber SMF (3) of the embodiment according to the present invention.

FIG. 4 shows the result of SMF(1), FIG. 5 shows the result of SMF(2), and FIG. 6 shows the result of SMF(3). The broken line shows the transmission loss before the hydrogen ageing and the solid line is that after hydrogen ageing.

In any case, the absorption loss in the vicinity of the wavelength of 630 nm, which existed before the hydrogen ageing, has disappeared after the hydrogen ageing. Moreover, after the hydrogen ageing, an increase of the transmission loss in the vicinity of the wavelength of 1385 nm is seen in SMF(2) and SMF(3).

This means the above-mentioned reaction of the expression (1) takes place in the optical fiber by the diffusion of the hydrogen molecule and the NBOHC disappears, and the OH group was generated.

Moreover, the transmission loss after the hydrogen ageing (it is assumed as transmission loss (b)) and the change of the transmission loss (b-a) by the hydrogen ageing at the wavelengths of 630 nm, 1310 nm, and 1385 nm is shown in Table 2.

Loss increase (b-a) of SMF(1) at 1385 nm by the hydrogen ageing is small, and transmission loss (b) at 1385 nm after hydrogen ageing has achieved to be 0.40 dB/km or less.

TABLE 2

| | | | Transmission loss (dB/km) | | | | | | | | |
|---|---|---|---|---|---|---|---|---|---|---|---|
| | | | Transmission loss before hydrogen ageing (a) | | | Transmission loss after hydrogen ageing (b) | | | (b · a) | | |
| | | Cutoff Wave- | Wave length (nm) | | | Wave length (nm) | | | Wave length (nm) | | |
| | Drawing Condition | length (nm) | 630 | 1310 | 1385 | 630 | 1310 | 1385 | 630 | 1310 | 1385 |
| SMF(1) | Condition 1 | 1165 | 8.75 | 0.327 | 0.308 | 6.06 | 0.330 | 0.345 | −2.69 | 0.003 | 0.037 |
| SMF(2) | Condition 2 | 1195 | 10.36 | 0.345 | 0.313 | 6.31 | 0.350 | 0.420 | −4.05 | 0.005 | 0.107 |
| SMF(3) | Condition 3 | 1203 | 15.59 | 0.349 | 0.315 | 6.78 | 0.377 | 0.977 | −8.81 | 0.028 | 0.662 |

All the optical fibers of the present embodiment are characterized by cutoff wavelengths of 1310 nm or shorter and the single mode propagation is ensured in the wavelength range of 1310 nm or longer. Here, the cutoff wavelength is the cable cutoff wavelength λ cc, as defined by ITU-T G.650.

The cutoff wavelength can be set to a desired value by properly adjusting the above-mentioned core diameter.

Moreover, all the optical fibers of the present invention have losses of 0.40 dB/km or less at 1385 nm, and the optical fibers having sufficiently small transmission loss are obtained.

2. Investigation of the Hydrogen-Proof Characteristic of the Optical Fiber

Next, hydrogen ageing was carried out to each sample. The hydrogen ageing condition was assumed according to the following condition of IEC60793-2 Amendment 1,2001-8 Annex C.

In short, SMF(1) has the transmission loss of 0.40 dB/km or less in all wavelength range of 1310 nm–1625 nm, and an optical fiber suitable for the WDM transmission in this wavelength range.

Since, in the optical fibers of SMF (2) and SMF (3), loss increase (b-a) in 1385 nm by the hydrogen ageing is large, transmission loss (b) at 1385 nm after hydrogen ageing cannot achieve 0.40 dB/km or less.

Moreover, the change of the transmission loss (b-a) at 630 nm and 1385 nm grows in the order of SMF(1), SMF(2), and SMF(3).

This means the amount of the NBOHC in the obtained optical fiber has changed by the change of the drawing condition.

In short, it is meant that the amount of the NBOHC in the obtained optical fiber has increased as the temperature of the drawing furnace rises, and the drawing speed fasts.

In this embodiment, though only the temperature of the drawing furnace and the drawing speed are the parameters of the drawing condition, the drawing condition is not limited to this case and contains all factors that can be controlled.

Moreover, the optimal value of those drawing conditions can not be decided to one value, due to the difference of the drawing machine etc.

3. Measurement the Density of the NBOHC

The coatings in each of SMF(1), SMF(2), and SMF(3) were removed by using the sulfuric acid solution and the obtained bare optical fiber was etched until becoming about 50 μm in the outer diameter by the diluted hydrofluoric acid.

The purpose of the reason to adjust the outer diameter to about 50 μm is to remove an extra cladding part in the outer part aiming to identify a structural defect in the MFD as accurately as possible. However, because handling the optical fiber became very difficult if the outside diameter was smaller than 50 μm, the above-mentioned outer diameter value was assumed.

Next, the density of the NBOHC was measured by the ESR method for each optical fiber. The results are shown in Table 3. N.D. in Table 3 shows that it is lower than the minimum limit of detection. The detection limit of the density of the NBOHC by the ESR method is $1\times10^{12}$ spins/g.

TABLE 3

| | NBOHC |
|---|---|
| | unit: spins/g |
| SMF(1) | N.D. |
| SMF(2) | $3.8 \times 10^{13}$ |
| SMF(3) | $1.1 \times 10^{14}$ |

The NBOHC was detected from SMF(2) and SMF(3) though the NBOHC was not detected from SMF(1) as shown in Table 3.

Figure 1:
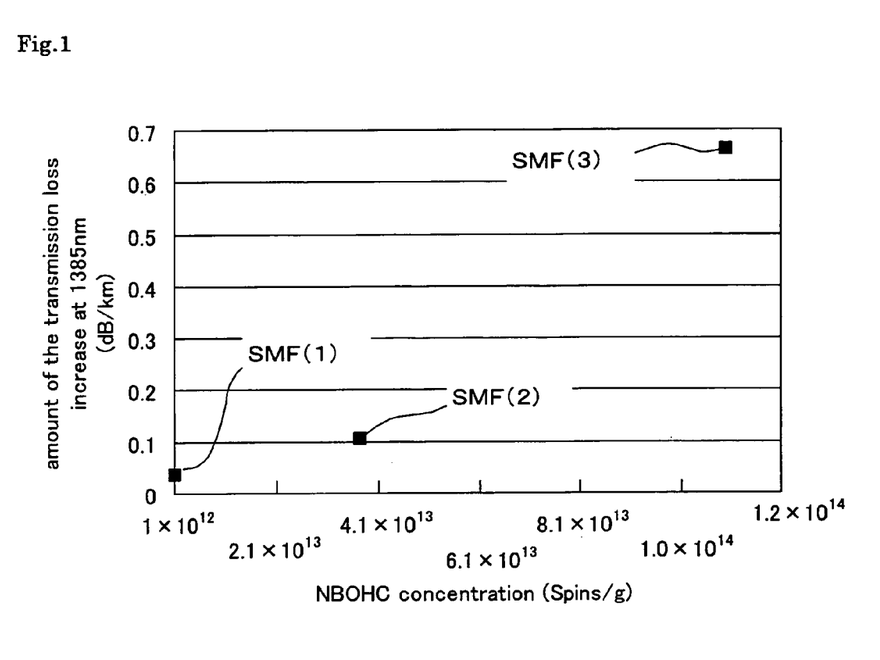
[FIG. 1]
The graph shows relations between the amount of an increase of the transmission loss at the wavelength of 1385 nm after hydrogen ageing and the NBOHC density of optical fibers of some embodiments according to the present invention, measured by the ESR method.

The relation between an increase of the transmission loss at the wavelength of 1385 nm after the hydrogen ageing (b-a) and the density of the NBOHC of each optical fiber was shown in FIG. 1.

As cleared from FIG. 1, if the density of the NBOHC measured by the ESR method in the above-mentioned measurement condition is $1\times10^{13}$ spins/g or less, the amount of an increase of the transmission loss at the wavelength of 1385 nm after the hydrogen ageing can be suppressed to be 0.10 dB/km or less.

That is, it is necessary to assume the density of the NBOHC detected by the ESR method under the above-mentioned measurement condition to be $1\times10^{13}$ spins/g or less to make an optical fiber with highly reliable hydrogen-proof characteristic which has suppressed the amount of an increase of the transmission loss at the wavelength of 1385 nm to be small after the hydrogen ageing.

4. Examination of Deuterium Processing

Next, the samples of 1000 m length were taken out of SMF(1), SMF(2), and SMF(3), they were exposed to the $N_2$ atmosphere including the deuterium gas for 24 hours under the normal temperature and 1 atmospheric pressure, then this was left in the open atmosphere for 14 days, and the transmission loss in wavelength of 550 nm–1700 nm was measured.

At this time, it is desirable that the deuterium gas is contained 0.01–100% in the $N_2$ gas, and 0.5–2% is more desirable. Moreover, it is desirable that the temperature of the atmosphere is 20–40 degrees Celsius.

Figure 7:
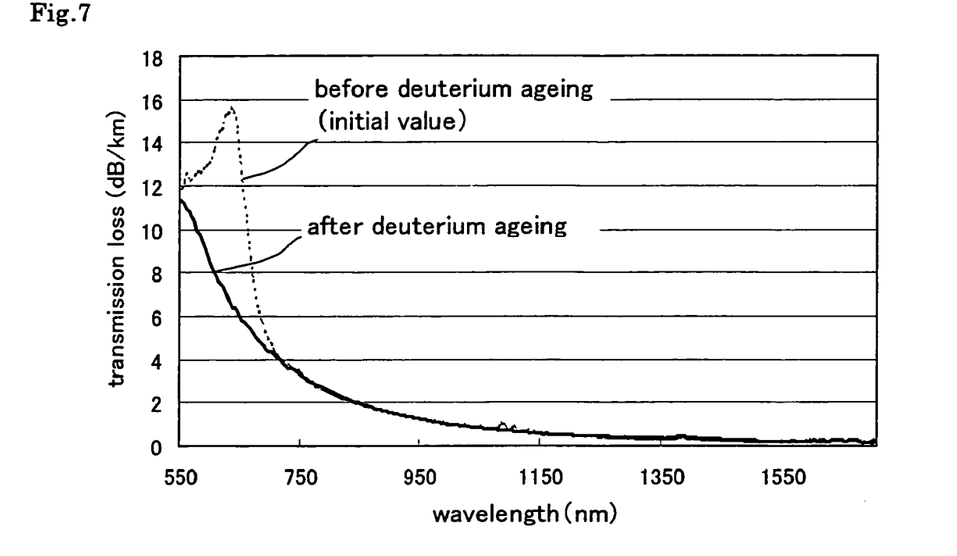
[FIG. 7]
It is a transmission loss spectrum before and after the deuterium ageing of an optical fiber of an embodiment according to the present invention.

FIG. 7 shows the transmission loss before and after the deuterium ageing of SMF(3). The broken line shows a transmission loss of the before deuterium ageing, and the solid line shows the after deuterium ageing.

As cleared from FIG. 7, the absorption loss in the vicinity of the wavelength of 630 nm disappears by the deuterium ageing and an increase in the transmission loss at the wavelength of 1385 nm has not happened either. This means the above-mentioned reaction of the expression (2) takes place by diffusion in the optical fiber of the deuterium molecule, and the NBOHC disappeared.

A similar result was obtained about SMF(1) and SMF(2).

In addition, when these optical fibers were exposed to hydrogen on the same condition as the condition mentioned above, and the transmission loss was measured, the change of transmission loss was hardly seen in 550 nm–1700 nm.

The result is shown in Table 4.[表4]

TABLE 4

| | Transmission loss (dB/km) | | | | | | | | |
|---|---|---|---|---|---|---|---|---|---|
| | Transmission loss before hydrogen ageing (a) Wave length (nm) | | | Transmission loss after hydrogen ageing (b) Wave length (nm) | | | (b · a) Wave length (nm) | | |
| | 630 | 1310 | 1385 | 630 | 1310 | 1385 | 630 | 1310 | 1385 |
| SMF(1) | 6.11 | 0.327 | 0.310 | 6.12 | 0.330 | 0.312 | 0.01 | 0.003 | 0.002 |
| SMF(2) | 6.31 | 0.345 | 0.315 | 6.35 | 0.350 | 0.319 | 0.04 | 0.005 | 0.004 |
| SMF(3) | 6.89 | 0.349 | 0.317 | 6.90 | 0.377 | 0.318 | 0.01 | 0.028 | 0.001 |

In a word, it is possible to make it to the optical fiber with little transmission loss increase at 1385 nm by giving the deuterium ageing of SMF(2) and SMF(3) that a transmission loss increase at 1385 nm after hydrogen ageing was large. In a word, the hydrogen-proof characteristic is improved by the deuterium ageing.

Therefore, it is necessary to have suppressed the increase of the transmission loss at the wavelength of 1385 nm small after the hydrogen ageing, and to make it to the optical fiber with high reliability to a hydrogen-proof characteristic, to carry out the deuterium ageing.

The optical fiber with the highest reliability to a hydrogen-proof characteristic can be obtained by manufacturing the optical fiber that the amount of the NBOHC is as a little as that of SMF(1), and giving it the deuterium ageing.

In this embodiment, the deuterium ageing was given to the optical fiber wound up to bobbin after drawing but the deuterium ageing may be given before resin coating. However, it is desirable to do enough deuterium ageing that it is carried out after the optical fiber wound up to the bobbin like this embodiment.

5. Measurement of Si(D)-E' and Ge(D)-E' Density

Si(D)-E' was measured by the ESR method with a bare optical fiber before and after the deuterium ageing. The result is shown in Table 5.

TABLE 5

| | units: spins/g | |
|---|---|---|
| | Before deuterium ageing | After deuterium ageing |
| SMF(1) | N.D | $6.0 \times 10^{12}$ |
| SMF(2) | N.D | $1.2 \times 10^{13}$ |
| SMF(3) | N.D | $1.0 \times 10^{13}$ |

The NBOHC and Ge(D)-E' was measured by the ESR method after the diameter of the optical fiber is made to be about 50 μm by etching in diluted hydrofluoric acid.

The value of the NBOHC before the deuterium ageing has been described the same value of Table 3. The result was shown in Table 6.

TABLE 6

| | units: spins/g | | | |
|---|---|---|---|---|
| | Before deuterium ageing | | After deuterium ageing | |
| | NBOHC | Ge(D)-E' | NBOHC | Ge(D)-E' |
| SMF(1) | N.D. | N.D | N.D. | $3.8 \times 10^{13}$ |
| SMF(2) | $3.8 \times 10^{13}$ | N.D | N.D. | $9.9 \times 10^{13}$ |
| SMF(3) | $1.1 \times 10^{14}$ | N.D | N.D. | $1.6 \times 10^{14}$ |

The reason to measure Si(D)-E' without etching the outside diameter in the state of about 125 μm is here that it is not necessary to etch because this defect exists over the entire fiber.

On the other hand, the purpose of the reason to measure Ge(D)-E' in the state of about 50 μm in the outside diameter is to raise the detection sensitivity because this defect exists only in the core to which Ge is added.

N.D. in Table 5 and Table 6 shows that it is less than minimum limit of detection. The minimum limit of detection of the density of the NBOHC, Si(D)-E' and Ge(D)-E' by the ESR method, is $1 \times 10^{12}$ spins/g here.

The following is clear from this result.
(1) The NBOHC has disappeared by the deuterium ageing.
(2) The ESR signal, that corresponds to Ge(D)-E' and Si(D)-E', is detected from the optical fiber that were carried out the deuterium ageing.

Figure 8:
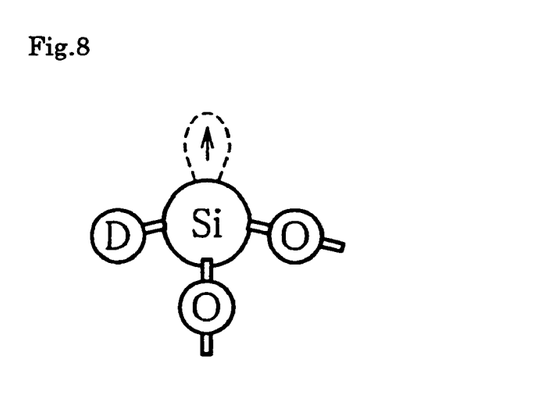
[FIG. 8]
It is pattern diagrams of the structural defect species detected by the ESR measurement after the deuterium ageing.
Figure 9:
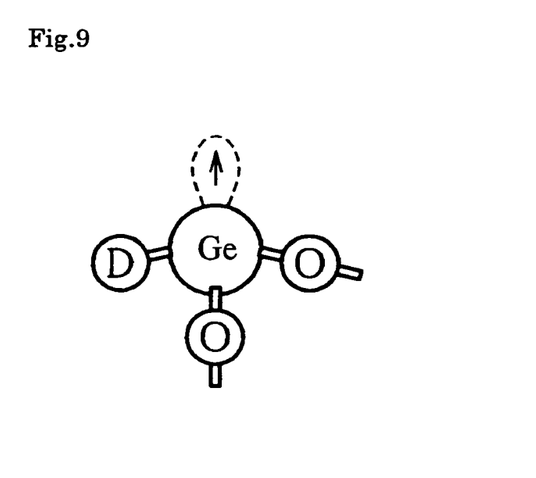
[FIG. 9]
It is pattern diagrams of the structural defect species detected by the ESR measurement after the deuterium ageing.

In this ESR measurement, the ESR signal, that corresponded to structural defect species (Ge(D)-E') shown in FIG. 8 and structural defect species (Si(D)-E') shown in FIG. 9 were detected. The identification of the defect species referred to research paper (T.-E. Tsai and D. L. Griscom, J. Non-Cryst. Solids 91(1987) 170) concerning ESR.

Because no detection of the ESR signal that corresponds to Ge(D)-E' and Si(D)-E' from the optical fiber before the deuterium ageing, it can be evaluated whether the deuterium ageing was given enough to the optical fiber by confirming whether the ESR signal, that corresponds to Ge(D)-E' and Si(D)-E', is detected by applying the ESR method.

That is, it is necessary to carry out the deuterium ageing to make it to the optical fiber with high reliability to a hydrogen-proof characteristic. In addition, it can ensure giving the deuterium ageing enough by Ge(D)-E' and Si(D)-E' are detected by the ESR method under the above-mentioned measurement condition.

In this embodiment, SMF of the step index type that the refractive index profile had shown in FIG. 2(a) was adopted. In general, Ge has been doped to the core as for this kind of optical fiber.

However, it is more suitable that the core is substantially formed with the pure silica glass of the state that Ge is not doped to the core for the transmission loss smaller. Such SMF is known as super-low loss SMF, and fluorine is usually doped to the cladding, lowers the refractive index more than the pure silica glass, and has achieved the refractive index difference between the core and the cladding.

The present invention is applicable also to such SMF.

Recently, the optical fiber developed to use it to WDM transmission tends to have the complex refractive index profile complicating the characteristic demanded to the optical fiber.

It is desirable that the softening characteristic of the each layer (viscosity characteristic) of the direction of the diameter is matched as much as possible when the optical fiber preform is manufactured to improve the transmission characteristic of these optical fibers, especially the hydrogen-proof characteristic.

Because, if the softening characteristic of the each layer has consistency, during drawing, the balance of the softening characteristic and cooling process in the cross-sectional direction of the optical fiber preform is optimized, consequently generating of structural defects is controlled.

The present invention can be applied to the optical fiber with various refractive index profiles including such an optical fiber.

The optical fiber of the present invention is an optical fiber that assumes by the electronic spin density of the NBOHC is $1 \times 10^{13}$ spins/g or less, and suppressed a transmission loss increase at 1385 nm to 0.10 dB/km or less by the hydrogen ageing.

Moreover, the optical fiber of the present invention is ensured that the deuterium ageing is given enough by the signal's being detected concerning Ge(D)-E' and Si(D)-E' when measuring it by the ESR method.

Therefore, the optical fiber of the present invention is an optical fiber with high reliability to the hydrogen-proof characteristic and suitable for WDM transmission in 1310 nm–1625 nm.

Moreover, it is enable to evaluate the hydrogen-proof characteristic by using the relation, which is found in the present invention, between the electronic spin density of the NBOHC and the amount of an increase of the transmission loss at the wavelength of 1385 nm by hydrogen ageing.

Moreover, it can be evaluated whether the deuterium ageing is sufficiently carried out based on the finding that when measuring by the ESR method, the signal concerning Si(D)-E' or Ge(D)-E' is detected from the optical fiber which the deuterium ageing is given.

In a word, a new evaluation method concerning the hydrogen-proof characteristic of the optical fiber is offered by the method of evaluating the optical fiber of the present invention.

What is claimed is:

1. A method of evaluation of an optical fiber comprising:
   measuring an electron spin density of a Non-Bridging Oxygen Hole Center by an electron spin resonance method after the diameter of the optical fiber is made to be about 50 μm by etching in diluted hydrofluoric acid; and
   estimating an amount of loss increase of the optical fiber at a wavelength of 1385 nm after hydrogen ageing, based upon said electron spin density of the Non-Bridging Oxygen Hole Center, wherein said loss increase after hydrogen ageing is measured after exposing the optical fiber to an atmosphere containing hydrogen of about 0.01 atmospheres at room temperature until an increase of a transmission loss of 0.03 dB/km or more at a wavelength of 1240 nm compared with a transmission loss before hydrogen ageing, and in open atmosphere for more than 14 days.

2. A method of evaluation of an optical fiber comprising:

measuring an electron spin density of a bare optical fiber by an electron spin resonance method; and evaluating whether a deuterium ageing is executed sufficiently on the optical fiber, based on a detection of a signal of Si(D)-E'.

3. A method of evaluation of an optical fiber comprising:

making a diameter of the optical fiber to be about 50 μm by etching in diluted hydrofluoric acid;

measuring an electron spin density of the optical fiber by an electron spin resonance method; and evaluating whether a deuterium ageing is executed sufficiently on the optical fiber, based on a detection of a signal of Ge(D)-E'.

* * * * *